(12) United States Patent
Hwang et al.

(10) Patent No.: US 11,845,365 B2
(45) Date of Patent: Dec. 19, 2023

(54) LOCKING DEVICE FOR WALK-IN SEAT OF VEHICLE

(71) Applicant: HYUNDAI TRANSYS INC., Seosan-si (KR)

(72) Inventors: Jun Sik Hwang, Hwaseong-si (KR); Hae Dong Kwak, Hwaseong-si (KR); Dong Hyun Kim, Hwaseong-si (KR); Cheol Hwan Yoon, Hwaseong-si (KR); Jung Bin Lee, Hwaseong-si (KR); Jae Yong Jang, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/659,240

(22) Filed: Apr. 14, 2022

(65) Prior Publication Data
US 2022/0332222 A1    Oct. 20, 2022

(30) Foreign Application Priority Data

Apr. 16, 2021    (KR) .................... 10-2021-0049659

(51) Int. Cl.
*B60N 2/12*    (2006.01)
*B60N 2/90*    (2018.01)

(52) U.S. Cl.
CPC ............. *B60N 2/12* (2013.01); *B60N 2/943* (2018.02); *B60N 2002/952* (2018.02); *B60N 2002/971* (2018.02)

(58) Field of Classification Search
None
See application file for complete search history.

(56) References Cited

U.S. PATENT DOCUMENTS

| | | | | |
|---|---|---|---|---|
| 3,859,753 | A | * 1/1975 | Marcuzzi | ............... E05F 11/382 |
| | | | | 49/351 |
| 2006/0128535 | A1* | 6/2006 | Smith | ................ A63B 21/4035 |
| | | | | 482/97 |

(Continued)

FOREIGN PATENT DOCUMENTS

| CN | 111516635 A | 8/2020 |
|---|---|---|
| CN | 112078440 A | 12/2020 |

(Continued)

OTHER PUBLICATIONS

Korean Notice of Allowance dated Sep. 14, 2022; Appln. No. 10-2021-0049659.

(Continued)

*Primary Examiner* — David E Allred (57) ABSTRACT

Disclosed is a locking device for a walk-in seat of a vehicle capable of stably maintaining the locked state of the walk-in seat prior to a walk-in operation. An object of the present invention is to provide a locking device for a walk-in seat of a vehicle capable of stably maintaining the locked state of the walk-in seat prior to a walk-in operation (that is, the locked state of a drive plate for the walk-in operation of the seat) even if the engagement between the drive plate and a pawl is released due to deformation caused by a torsional load applied to a connection frame of the seat by additionally providing a separate component configured to prevent the drive plate from being rotated in an unlocking direction when a load is applied to a seat belt buckle.

6 Claims, 7 Drawing Sheets

MOVEMENT OF
BUCKLE HINGE PIN (56) References Cited

U.S. PATENT DOCUMENTS

| | | | |
|---|---|---|---|
| 2013/0147241 A1 | 6/2013 | Park et al. | |
| 2014/0159457 A1* | 6/2014 | Jaranson | B60N 2/20 |
| | | | 297/362.11 |
| 2020/0247352 A1 | 8/2020 | Shimazu et al. | |
| 2020/0391621 A1 | 12/2020 | Jung et al. | |

FOREIGN PATENT DOCUMENTS

| | | | | |
|---|---|---|---|---|
| GB | 804210 A | * | 11/1958 | |
| JP | 2004352135 A | | 12/2004 | |
| JP | 2010247575 A | | 2/2014 | |
| KR | 101550152 B1 | | 9/2015 | |
| KR | 1020200049060 A | | 5/2020 | |
| KR | 102184744 B1 | | 12/2020 | |
| KR | 1020200143585 A | | 12/2020 | |
| WO | 2012/123799 A1 | | 9/2012 | |
| WO | WO-2021163659 A1 | * | 8/2021 | B60N 2/0232 |

OTHER PUBLICATIONS

Chinese Decision To Grant; dated May 23, 2023; Appln. No. 202210382046.9.

German Office Action dated Mar. 3, 2023; File No. 10 2022 109 222.4.

\* cited by examiner

MOVEMENT OF
BUCKLE HINGE PIN

LOCKING DEVICE FOR WALK-IN SEAT OF VEHICLE

This application claims the benefit of Korean Patent Application No. 10-2021-0049659, filed on Apr. 16, 2021, the entireties of which are hereby incorporated herein by reference.

BACKGROUND

(a) Technical Field

The present disclosure relates to a locking device for a walk-in seat of a vehicle, and particularly to a locking device for a walk-in seat of a vehicle capable of stably maintaining the locked state of the walk-in seat prior to a walk-in operation.

(b) Background Art

Generally, seats mounted in the interior of a passenger vehicle are installed in one or two rows. In the case of vans and sports utility vehicles, seats are installed in three or more rows, and seats may also be installed in various other arrangements.

In such vehicle seats, various mechanisms offering comfortable seating to passengers or convenient entry and exit are employed.

Particularly, in the case of a vehicle in which three or more rows of seats are installed, passengers may open a front door and a rear door and directly access a first-row seat and a second-row seat, respectively. However, in most cases including a third-row seat, a mechanism for securing a passage for entry and exit by moving the second-row seat forwards is employed.

For example, as a second-row seat for securing a passage for entry and exit for a third-row seat, a double-folding type seat configured incline a seatback, which is folded on a seat cushion, forwards together with the seat cushion, a cushion tilt-up sliding type seat configured to slide a seatback and a seat cushion forwards with the front end of the seat cushion rotated upwards, or a tilting-walk-in type seat configured to rotate the seatback forwards so as to vertically erect the same while tilting the seat cushion downwards is adopted.

Figure 1:
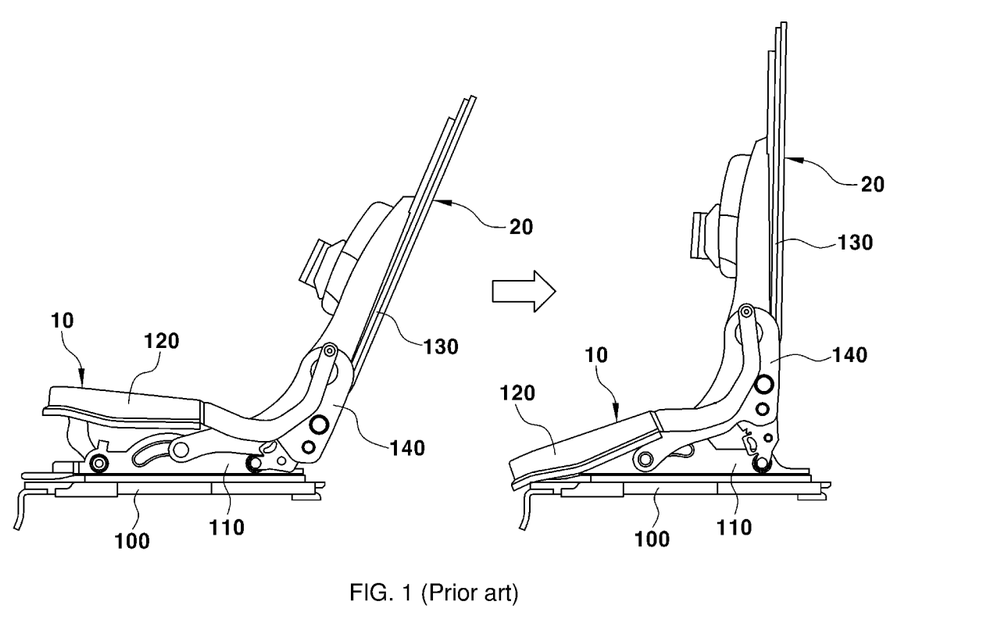
FIG. 1 is a side view illustrating a trajectory along which a tilting-walk-in type second-row seat is operated.

FIG. 1 is a side view illustrating the trajectory along which a tilting-walk-in type second-row seat is operated.

As illustrated in FIG. 1, an operation in which a seat cushion 10 of a tilting-walk-in type second-row seat is tilted downwards and an operation in which a seatback 20, which has been inclined backwards, is rotated forwards and vertically erected are performed simultaneously, thereby making it easily to secure a passage for entry and exit for a passenger sitting in a third-row seat.

More specifically, in a structure in which a seat cushion frame 120 is tiltably connected to a side frame 110, which is fixedly mounted on a seat rail 100, and a connection frame 140, which interconnects the seat cushion frame 120 with a seatback frame 130, is rotatably connected to the side frame 110, an operation of tilting the seat cushion frame 120 downwards and an operation of vertically erecting the seatback frame 130 and the connection frame 140 while rotating the same forwards are performed so as to make it easy to secure a passage for entry and exit for a passenger of the third-row seat.

The operation of tilting the seat cushion and the operation of rotating the seatback for the tilting-walk-in type second-row seat should be performed only when securing a passage for entry and exit for a third-row seat, and in normal times, for the safety of an occupant of the second-row seat, the seat cushion and the seatback should be maintained in a locked state using a separate locking device for a walk-in seat.

In other words, the operation of tilting the seat cushion and the operation of rotating the seatback are performed when the locking device for a walk-in seat is unlocked, and when locking the locking device, the seat cushion and the seatback should be maintained in a locked state, in which the seat cushion and the seatback do not move, for the safety of the occupant of the second-row seat.

Figure 2:
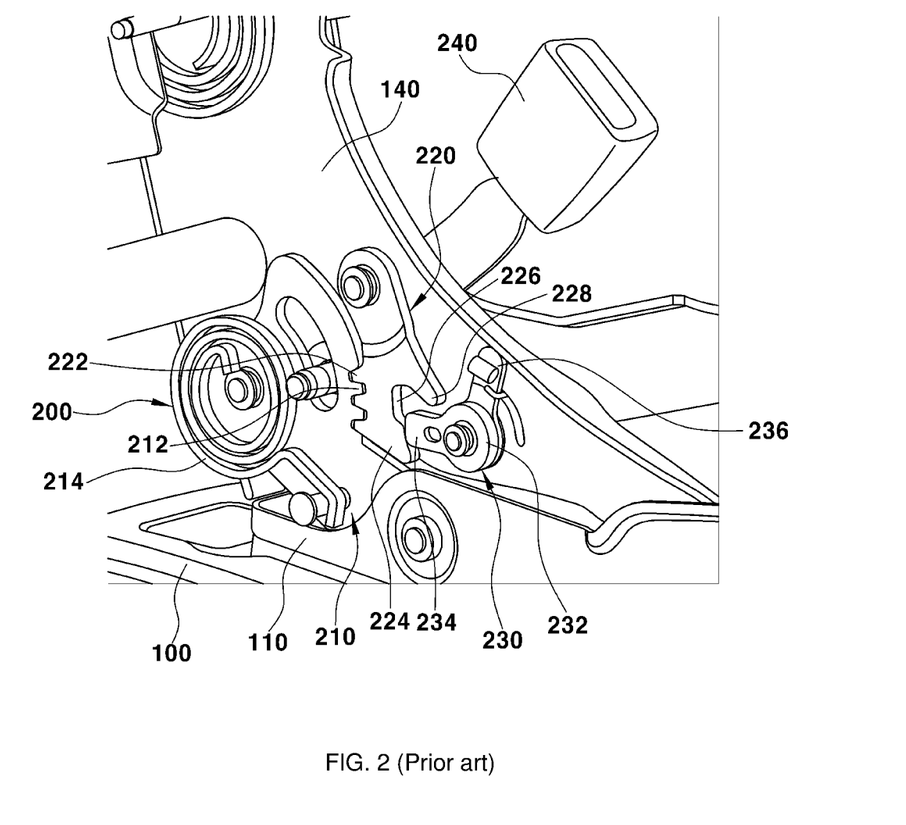
FIG. 2 is a perspective view illustrating components of a conventional locking device for a walk-in seat.
Figure 3:
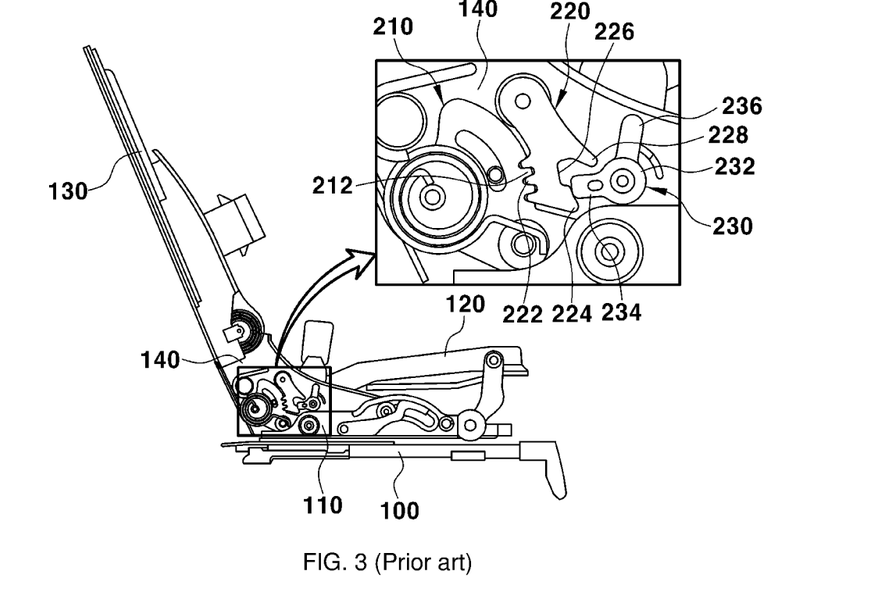
FIG. 3 is a side view illustrating the locked state of a conventional locking device for a walk-in seat.
Figure 4:
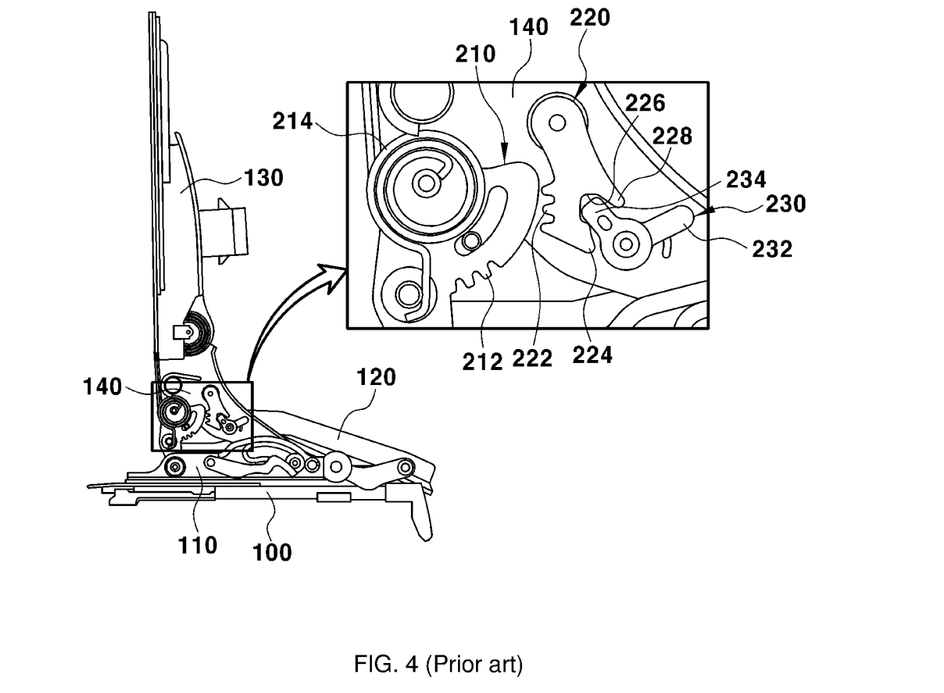
FIG. 4 is a side view illustrating the unlocked state of a conventional locking device for a walk-in seat.

FIG. 2 is a perspective view illustrating components of the conventional locking device for a walk-in seat, FIG. 3 is a side view illustrating the locked state of a conventional locking device for a walk-in seat, and FIG. 4 is a side view illustrating the unlocked state of the conventional locking device for a walk-in seat.

As illustrated in FIGS. 2 to 4, for a walk-in operation, the seat cushion frame 120 is tiltably connected to the side frame 110, which is fixedly mounted on the seat rail 100, and the connection frame 140, which interconnects the seat cushion frame 120 with the seatback frame 130, is rotatably connected to the side frame 110.

Particularly, a locking device 200 for a walk-in seat is mounted between the connection frame 140 and the side frame 110.

The locking device 200 for a walk-in seat includes, as illustrated in FIG. 2, a drive plate 210 for walk-in operation, a pawl 220 configured to lock or unlock the drive plate 210, and a locking lever 230 configured to rotate the pawl 220 in a direction of locking or unlocking the drive plate 210.

The drive plate 210 has a structure in which opposite ends thereof are hinged to the side frame 110 and the connection frame 140, respectively, and a sector gear 212 is formed on the front surface thereof.

The pawl 220 has an upper end hinged to the connection frame 140 at a predetermined position thereof. In addition, the pawl 220 is formed, at the lower rear surface thereof, with a locking gear 222, which is meshed with the sector gear 212, and, at the lower front surface thereof, with a locking protrusion 224, an unlocking groove 226, and an unlocking protrusion 228, which are sequentially disposed in that order from beneath.

The locking lever 230 includes a body 232 hinged to the connection frame 140, a locking pin 234 protruding from the rear portion of the body 232 so as to push the locking protrusion 224 towards the sector gear 212 when the locking device for a walk-in seat is locked or so as to be inserted into the unlocking groove 226 while pushing the unlocking protrusion 228 when the locking device for a walk-in seat is unlocked, and a cable-connecting end 236 protruding from the upper portion of the body 232 and connected to a user-operable walk-in operation lever (not shown) via a cable 238.

Here, locking and unlocking operations of the conventional locking device for a walk-in seat described above are as follows.

Figure 5:
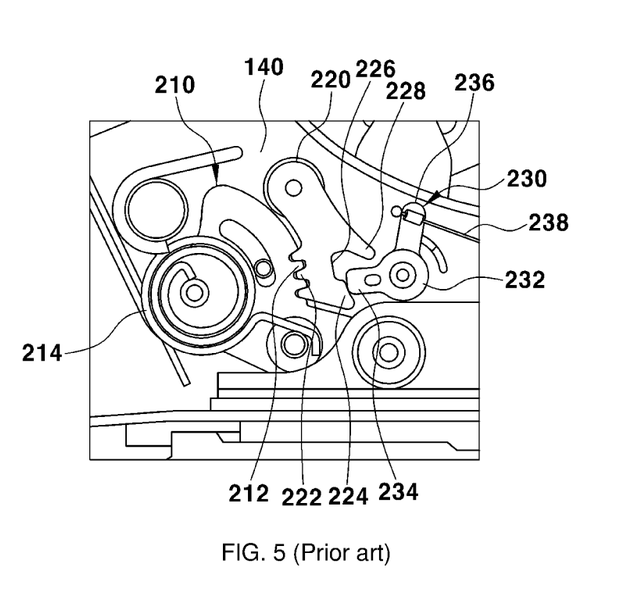
FIG. 5 is an enlarged view of a main portion of a conventional locking device for a walk-in seat illustrating the locked state thereof.
Figure 6:
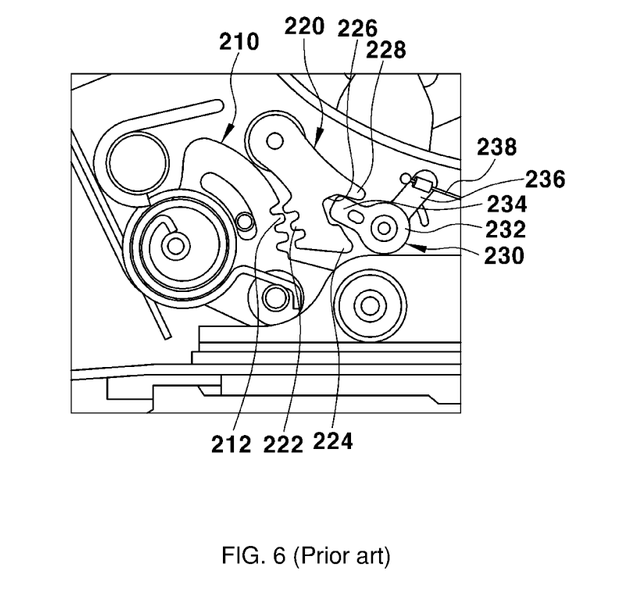
FIGS. 6 and 7 are enlarged views of a main portion of a conventional locking device for a walk-in seat illustrating an unlocking operation thereof.
Figure 7:
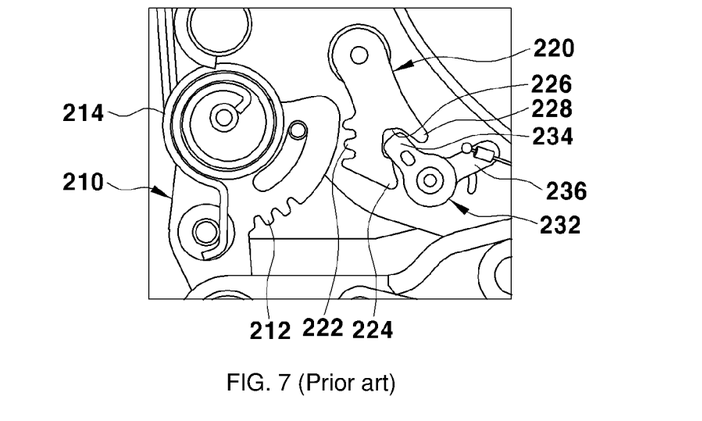

FIG. 5 is an enlarged view of a main portion of the conventional locking device for a walk-in seat illustrating the locked state thereof, and FIGS. 6 and 7 are enlarged views of the main portion of the conventional locking device for a walk-in seat illustrating the unlocked state thereof.

Referring to FIG. 5, when the locking pin 234 of the locking lever 230 is arranged at a position for pushing the locking protrusion 224 of the pawl 220, the locking gear 222 of the pawl 220 is meshed with the sector gear 212 of the drive plate 210 so as to prevent the drive plate 210 from moving, and as such, the drive plate 210 may be maintained in a fixed state, in which the drive plate 210 does not move, by being placed at a position prior to the walk-in operation.

On the other hand, when the cable 238 is pulled because a user operates the walk-in operation lever (not shown) for the walk-in operation, the cable-connecting end 230 of the locking lever 236 is rotated forwards, and at the same time, the locking pin 234 is inserted into the unlocking groove 226 while pushing the unlocking protrusion 228 of the pawl 220, as illustrated in FIG. 6, thereby allowing the pawl 220 to be rotated in an unlocking direction.

Subsequently, since the pawl 220 is rotated in the unlocking direction, the locking gear 222 of the pawl 220 is separated from the sector gear 212 of the drive plate 210.

Accordingly, as illustrated in FIG. 7, the drive plate 210 is rotated to a walk-in operable position, that is, a position in which the seatback frame 130 and the connection frame 140 are vertically erected while being rotated forwards by the elastic restoring force of a coil spring 214.

However, the conventional locking device for a walk-in seat has the following problems.

As illustrated in FIG. 1, a buckle 240 configured to fasten a seat belt is mounted on the connection frame 140. In this structure, since a load is applied every time a tongue of the seat belt is fastened to the buckle 240, a torsional load is applied to the connection frame 140, thereby causing deformation.

Particularly, when the connection frame 140 is deformed by the torsional load, the pawl 220 is unexpectedly rotated in the unlocking direction, so the locking gear 222 of the pawl 220 becomes separated from the sector gear 212 of the drive plate 210, and as such, the locking device for a walk-in seat is undesirably unlocked.

In addition, when the locking device for a walk-in seat is undesirably unlocked as described above, a safety problem may occur for passengers seated in the second row, and even if the locking device for a walk-in seat is locked again, unlocking of the locking device is easily and inevitably repeated.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to solve the above-described problems associated with the prior art, and it is an object of the present invention to provide a locking device for a walk-in seat of a vehicle capable of stably maintaining the locked state of the walk-in seat prior to a walk-in operation (that is, the locked state of a drive plate for a walk-in operation of the seat) even if the engagement between the drive plate and a pawl is released due to deformation caused by a torsional load in a connection frame of the seat by further providing a separate component configured to prevent a drive plate from rotating in an unlocking direction when a load is applied to a seat belt buckle.

The objects of the present invention are not limited to the above-mentioned object, and other objects of the present invention not mentioned herein may be understood based on the following description, and may be understood more clearly through the embodiments of the present invention. In addition, the object of the present invention may be realized by means and combinations thereof indicated in the claims.

In one aspect, the present invention provides a locking device for a walk-in seat of a vehicle, the locking device including a drive plate having one end hinged to a connection frame interconnecting a seatback frame with a seat cushion frame and having another end hinged to a side frame fixedly mounted to a seat rail, formed with a sector gear at a front surface thereof, and having formed therein a slot disposed behind the sector gear, a pawl having an upper end hinged to the connection frame and having a lower rear surface formed with a locking gear meshing with the sector gear, a buckle hinge pin provided at a lower end of a buckle for a seat belt and having one end passing through both one end of a buckle bracket, which is hinged to the connection frame, and the connection frame so as to be inserted into the slot, and a slot extension hole extending from a lower end of the slot towards the sector gear and into which the buckle hinge pin enters and is positioned when a load is applied to the buckle.

In an exemplary embodiment, the buckle hinge pin may remain positioned at the lower end of the slot when no load is applied to the buckle in the state in which the sector gear and the locking gear are engaged with each other.

In another exemplary embodiment, the buckle bracket may be connected with a return spring configured to generate elastic restoring force while extending when a load is applied to the buckle.

In still another exemplary embodiment, the connection frame may have formed therein a long hole configured to allow the buckle hinge pin to move from the lower end of the slot to enter the slot extension hole when a load is applied to the buckle.

In yet another exemplary embodiment, the long hole may be provided with a bush configured to reduce friction between the connection frame and the buckle hinge pin.

In still yet another exemplary embodiment, the connection frame may be provided with a locking lever, which is configured to rotate the pawl in a direction of locking or unlocking the drive plate hinged thereto.

Other aspects and exemplary embodiments of the invention are discussed infra.

It is to be understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter, an embodiment of the present invention will be described with reference to the accompanying drawings. The matters described in the attached drawings may be different from those actually implemented in order to facilitate description of the embodiments of the present invention.

Throughout the specification, when an element is referred to as "including" another element, it means that the element may include other elements as well, without excluding other elements, unless specifically stated otherwise.

Figure 8:
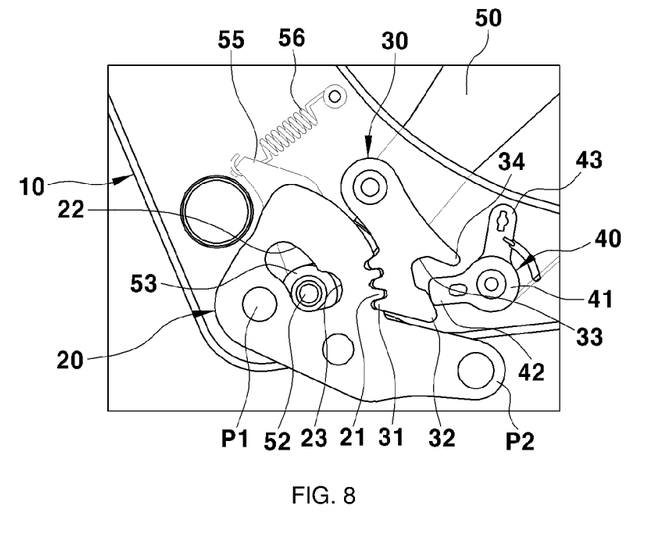
FIG. 8 is a view of a locking device for a walk-in seat of a vehicle viewed from the inner side of a connection frame.
Figure 9:
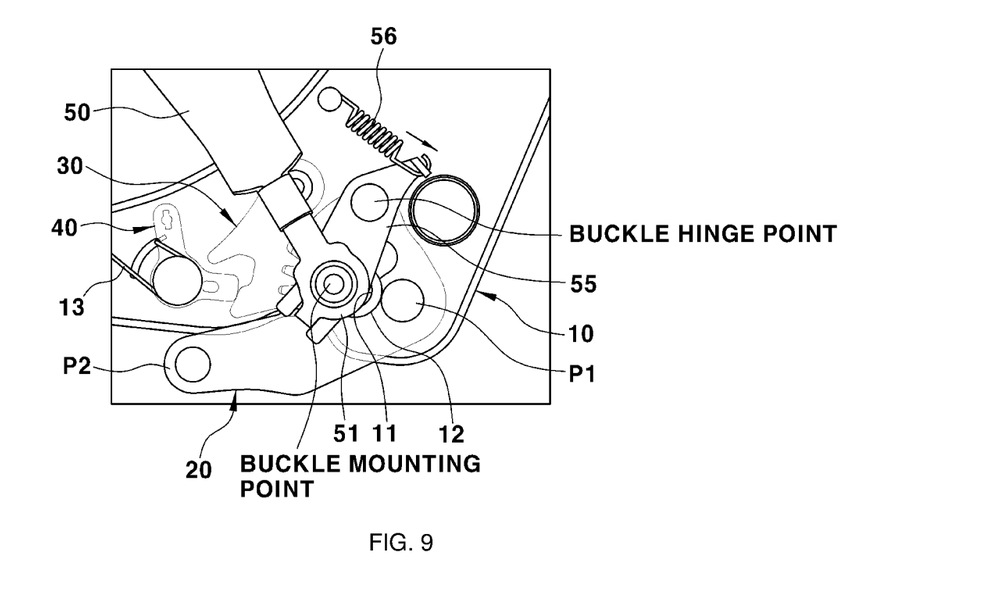
FIG. 9 is a view of a locking device for a walk-in seat of a vehicle viewed from the outer side of a connection frame.

FIG. 8 is a view of a locking device for a walk-in seat of a vehicle viewed from the inner side of a connection frame, and FIG. 9 is a view of the locking device for a walk-in seat of a vehicle viewed from the outer side of the connection frame. FIG. 8 is a view of the state in which a buckle hinge pin is positioned at the lower end of a slot, and FIG. 9 is a view of the state in which the buckle hinge pin is positioned in a slot extension hole.

As illustrated in FIGS. 8 and 9, a connection frame 10 has mounted thereon a drive plate 20, a pawl 30, a locking lever 40, etc., which are configured to allow or prevent a walk-in operation of a walk-in seat.

The connection frame 10 interconnects the rear portion of a seat cushion frame and the lower portion of a seatback frame, and although not shown in the drawing, the connection frame 10 is, for the walk-in operation, rotatably coupled to a side frame fixedly mount on a seat rail.

The drive plate 20 is provided to perform the walk-in operation of the walk-in seat, and has opposite ends hinged to the connection frame 10 and the side frame, respectively. One end of the drive plate 20 is a first hinge point P1 hinged to the connection frame 10, and another end of the drive plate 20 is a second hinge point P2 hinged to the side frame.

The drive plate 20 has, at the front surface thereof, an externally toothed sector gear 21, and has a slot 22 arranged at the rear of the sector gear 21.

The slot 22 is formed in an area between the first hinge point P1 and the sector gear 21 in the drive plate 20, and extends in the shape of an arc centered on the first hinge point P1.

In addition, the drive plate 20 has a slot extension hole 23 extending from the lower end of the slot 22.

The slot extension hole 23 extends from the lower end of the slot 22 towards the sector gear 21, and is arranged at a position between the first hinge point P1 of the drive plate 20 and the sector gear 21.

The pawl 30 is configured to lock or unlock the drive plate 20, which is arranged at the rear of the pawl 30. The pawl 30 has an upper end hinged to the connection frame 10 at a predetermined position thereof, and the pawl 30 is formed, at the lower rear surface thereof, with a locking gear 31 selectively meshed with the sector gear 21.

In addition, the pawl 30 is formed, at the lower front surface thereof, with a locking protrusion 32, an unlocking groove 33, and an unlocking protrusion 34. Here, the locking protrusion 32, the unlocking groove 33, and the unlocking protrusion 34 are sequentially disposed in that order from beneath.

The locking lever 230 is configured to rotate the pawl 220 in a direction of locking or unlocking the drive plate 210. The locking lever 230 is mounted on the connection frame 10 and disposed at the front of the pawl 30.

The locking lever 40 includes a body 41 hinged to the connection frame 10, a locking pin 42 protruding from one side of the circumference of the body 41, and a cable-connecting end 43 protruding from one side of the circumference of the body 41 at a predetermined distance from the locking pin 42.

When locking the driving plate 20, the locking pin 42 pushes the locking protrusion 32 towards the sector gear 21. Conversely, when unlocking the driving plate 20, the locking pin 42 is inserted into the unlocking groove 33 while pushing the unlocking protrusion 34.

The cable-connecting end 43 is connected to a user-operable walk-in operation lever (not shown) via a cable, and is elastically supported by a spring member 13 in the direction in which the locking pin 42 pushes the locking protrusion 32 towards the sector gear 21.

Meanwhile, the connection frame 10 has also mounted thereon a buckle 50 for a seat belt, which is configured to fasten the seat belt.

Here, the drive plate 20, the pawl 30, and the locking lever 40 are mounted to be arranged on the inner surface of the connection frame 10, and the buckle 50 is mounted to be arranged on the outer surface of the connection frame 10 together with a buckle bracket 55.

The buckle 50 is a part to which the tongue of the seat belt is fastened. The buckle 50 is integrally formed, at the lower end thereof, with a buckle-mounting portion 51, and the buckle-mounting portion 51 has a buckle hinge pin 52 protruding therefrom.

The buckle 50 receives a load due to fastening with the tongue of the seat belt, or due to other reasons. Specifically, the buckle 50 receives a load in a direction moving toward the sector gear 21 while being spaced apart from and away from the slot 22.

The buckle bracket 55 has one end hinged to the connection frame 10 at a predetermined position thereof, and has another end to which the buckle-mounting portion 51 is coupled.

In addition, a return spring 56, which generates elastic restoring force while extending when the buckle bracket 55 is rotated by a load applied to the buckle 50, is connected to the one end of the buckle bracket 55.

The return spring 56 has one end connected to the one end of the buckle bracket 55, and has another end fixedly mounted to the connection frame 10.

The buckle hinge pin 52 passes both through the other end of the buckle bracket 55 and through the connection frame 10 at a predetermined position thereof, and is inserted into the slot 22 in the drive plate 20, which is mounted on the inner surface of the connection frame 10.

The buckle hinge pin 52 passes through the connection frame 10 and a buckle nut 53 is fastened to the end of the buckle hinge pin 52, which is inserted into the slot 22 in the drive plate 20. The buckle nut 53 may be a T-shaped nut.

The buckle-mounting portion 51 is coupled to the other end of the buckle bracket 55 with the buckle hinge pin 52 passing both through the other end of the buckle bracket 55 and through the connection frame 10 at the predetermined position.

Here, one end of the buckle bracket 55 that is hinged to the connection frame 10 is the hinge point of the buckle 50, and the buckle hinge pin 52 of the buckle-mounting portion 51 passing both through the other end of the buckle bracket 55 and through the connection frame 10 is the mounting point of the buckle 50.

Figure 11:
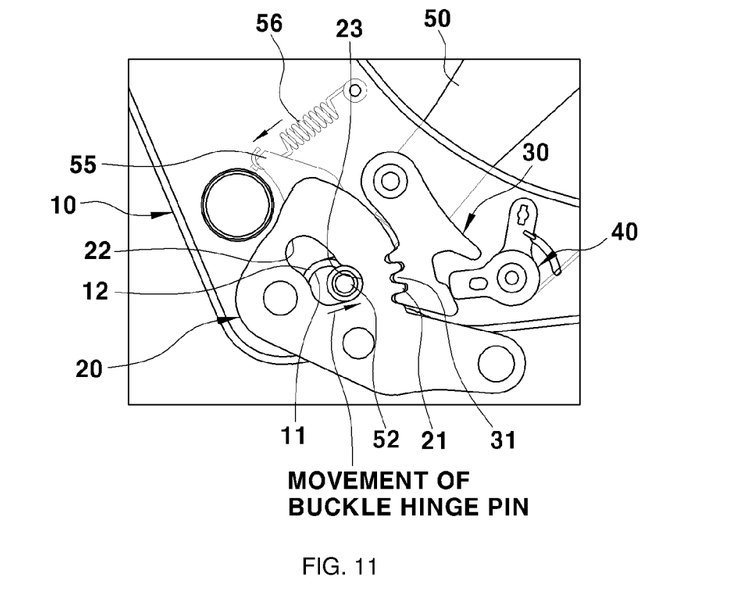
FIG. 11 is a view of the state in which a buckle hinge pin is moved into a slot extension hole when a load is applied to a buckle as viewed from the inner side of a connection frame.

Referring to FIG. 11 together with FIG. 9, a long hole 11, through which the buckle hinge pin 52 passes, is formed in the connection frame 10 at the predetermined position, and the long hole 11 extends forwards and has a predetermined length.

The long hole 11 is formed so that when a load is applied to the buckle 50, the buckle hinge pin 52 may move from the lower end of the slot 22 so as to enter the slot extension hole 23. The long hole 11 is formed to extend towards the locking lever 40 from the front of the first hinge point P1 of the drive plate 20.

In addition, in the long hole 11, a bush 12 is mounted in order to reduce friction between the connection frame 10 and the buckle hinge pin 52, both of which are made of metal, and in order to prevent noise caused by the friction.

The bush 12 is disposed on the rim of the long hole 11 so as to prevent friction between the buckle hinge pin 52 and the connection frame 10, and is made of a material capable of reducing noise generated during friction with the buckle hinge pin 52.

The operating state of the locking device for a walk-in seat of the present invention having the above-described configuration is described below.

State Prior to Walk-In Operation: Drive Plate 20 Locked

Figure 10:
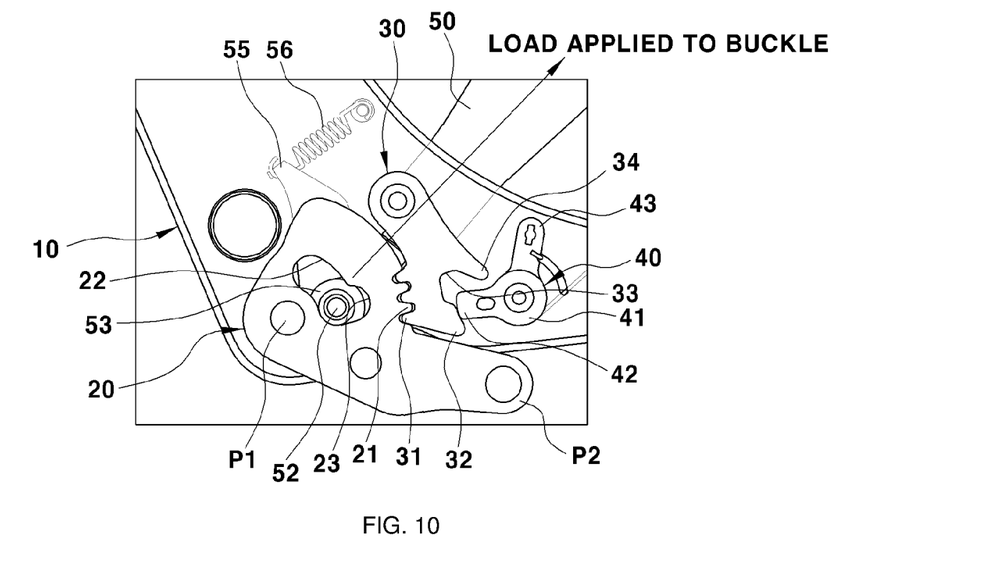
FIG. 10 is a view illustrating a load applied to a buckle for a seat belt in the state in which a buckle hinge pin, which is one of the components of the locking device for a walk-in seat of the present invention, is located at the lower end of a slot.

The attached FIG. 10 illustrates a load applied to the buckle for the seat belt in the state in which the buckle hinge pin, which is one of the components of the locking device for a walk-in seat of the present invention, is located at the lower end of the slot, and FIG. 11 is a view of the state in which the buckle hinge pin is moved into the slot extension hole when a load is applied to the buckle, as viewed from the inner side of the connection frame. For reference, FIG. 9 is a view of the state in which the buckle hinge pin is moved into the slot extension hole when a load is applied to the buckle, as viewed from the outer side of the connection frame.

Referring to FIG. 10, in the state prior to the walk-in operation of the walk-in seat, that is, in the locked state of the drive plate 20, the sector gear 21 of the drive plate 20 and the locking gear 31 of the pawl 30 are maintained engaged with each other, and the buckle hinge pin 52 remains positioned at the lower end of the slot 22 in the drive plate 20.

The buckle hinge pin 52 remains positioned at the lower end of the slot 22 when no load is applied to the buckle 50 in the state in which the sector gear 21 and the locking gear 31 are engaged with each other.

When a load is applied to the buckle 50 as illustrated in FIG. 10 in the state in which the drive plate 20 is locked, the buckle hinge pin 52 is pulled towards the sector gear 21 and moves from the lower end of the slot 22 so as to be positioned in the slot extension hole 23, as illustrated in FIG. 11.

Referring to FIG. 9, the buckle 50 and the buckle-mounting portion 51 rotate about one end of the buckle bracket 55, which is hinged to the connection frame 10 by the load. Here, the return spring 56 is stretched to generate an elastic restoring force.

When the load applied to the buckle 50 is removed, the buckle bracket 55 is restored to its original state by the elastic restoring force of the return spring 56, and the buckle hinge pin 52 returns to the lower end of the slot 22.

As illustrated in FIG. 11, when the buckle hinge pin 52 enters the slot extension hole 23 and is locked therein by the load applied to the buckle 50, the buckle hinge pin 52, separately from the pawl 30, may prevent the drive plate 20 from being rotated in the unlocking direction. Accordingly, even if the engagement between the drive plate 20 and the pawl 30 is released due to deformation of the connection frame 10 caused by a torsional load applied thereto, the locked state of drive plate 20 is stably maintained by the buckle hinge pin 52. As a result, it may be possible to prevent unexpected unlocking of the drive plate 20 (i.e., unlocking of the walk-in seat) when a load is applied to the buckle 50.

Operable State of Walk-In Operation: Drive Plate 20 Unlocked

Figure 12:
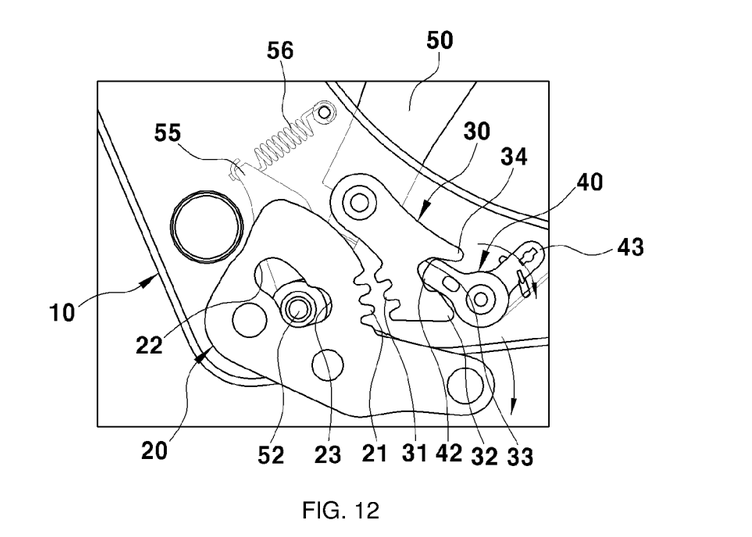
FIG. 12 is a view illustrating an unlocked state of a locking device of a walk-in seat according to the present invention.

FIG. 12 is a view illustrating the unlocked state of the locking device of a walk-in seat according to the present invention.

When a cable is pulled because a user operates the walk-in operation lever (not shown), the cable-connecting end 43 of the locking lever 40 is pulled by the cable so as to rotate the locking lever 40 by a predetermined angle in the unlocking direction, as illustrated in FIG. 12.

When the locking lever 40 is rotated in the unlocking direction, the locking pin 42 lifts the unlocking protrusion 34 while being inserted into the unlocking groove 33, thereby releasing the engagement between the locking gear 31 of the pawl 30 and the sector gear 21 of the drive plate 20.

Because the engagement between the locking gear 31 and the sector gear 21 is released, the drive plate 20 is unlocked, which corresponds to the state of being rotatable to the walk-in operation position.

Although not shown in the drawing, the drive plate 20 is in a state of being rotatable to a position for the walk-in operation by the elastic restoring force of a coil spring (not shown), that is, a position at which the seatback frame and the connection frame 10 of the walk-in seat are rotated forwards so as to be vertically erected. The coil spring (not shown) has opposite ends connected to the connection frame 10 and the drive plate 20, and is configured to generate an elastic restoring force when the driving plate 20 is at a position prior to performing the walk-in operation.

When the engagement between the drive plate 20 and the pawl 30 is released and the drive plate 20 is rotated to the walk-in operation position, the buckle hinge pin 52 is positioned at the upper end of the slot 22 while being positioned at the rear end of the long hole 11 in the connection frame 10.

As described above, in the locking device of the walk-in seat of the present invention, even if the slot extension hole 23 is additionally provided in the drive plate 20, unlocking of the drive plate 20 and the walk-in operation accordingly are performed normally.

As is apparent from the above description, the present invention provides the following effects.

Since a buckle hinge pin enters a slot extension hole in a drive plate due to application of a load to a buckle, it may be possible to more assuredly prevent a drive plate from being rotated in an unlocking direction. Accordingly, even if the engagement between the drive plate and a pawl is released due to deformation caused by application of a torsional load to a connection frame of a seat, rotation of the drive plate in the unlocking direction is prevented by the buckle hinge pin. As a result, it may be possible to prevent the situation in which the locked state of the drive plate is unintentionally released (i.e., unintentional unlocking of the walk-in seat) when a load is applied to the buckle.

Embodiments of the present invention have been described above in detail. Terms or words used in this specification and claims described below should not be construed as being limited to conventional or dictionary meanings. In addition, the scope of the present invention is not limited to the above-described embodiments, and various modifications and improvements by those skilled in the art using the basic concept of the present invention as defined in the claims below will also be included in the scope of the present invention.

What is claimed is:

1. A locking device for a walk-in seat of a vehicle, the locking device comprising:
 a drive plate having one end hinged to a connection frame interconnecting a seatback frame with a seat cushion frame and having another end hinged to a side frame fixedly mounted to a seat rail, the drive plate formed with a sector gear at a front surface thereof, and having formed therein a slot disposed behind the sector gear;
 a pawl having an upper end hinged to the connection frame and having a lower rear surface formed with a locking gear meshing with the sector gear;
 a buckle hinge pin provided at a lower end of a buckle for a seat belt and having one end passing both through one end of a buckle bracket, the buckle bracket hinged to the connection frame, and through the connection frame so as to be inserted into the slot; and
 a slot extension hole extending from a lower end of the slot towards the sector gear and into which the buckle hinge pin enters to be positioned therein when a load is applied to the buckle.

2. The locking device according to claim 1, wherein the buckle hinge pin remains positioned at the lower end of the slot when no load is applied to the buckle in a state in which the sector gear and the locking gear are engaged with each other.

3. The locking device according to claim 1, wherein the buckle bracket is connected with a return spring configured to generate elastic restoring force while extending when a load is applied to the buckle.

4. The locking device according to claim 1, wherein the connection frame has formed therein a long hole configured to allow the buckle hinge pin to move from the lower end of the slot to enter the slot extension hole when a load is applied to the buckle.

5. The locking device according to claim 4, wherein the long hole is provided with a bush configured to prevent friction between the connection frame and the buckle hinge pin.

6. The locking device according to claim 1, wherein the connection frame is provided with a locking lever hinged thereto, the locking lever configured to rotate the pawl in a direction of locking or unlocking the drive plate.

* * * * *